United States Patent
Guan et al.

(10) Patent No.: US 11,009,709 B2
(45) Date of Patent: May 18, 2021

(54) COMPACT LCOS PROJECTOR FOR WEARABLE AR DEVICES

(71) Applicant: YUTOU TECHNOLOGY (HANGZHOU) CO., LTD., Hangzhou (CN)

(72) Inventors: Liang Guan, San Carlos, CA (US); Kun Li, San Carlos, CA (US); Lin Cheng, San Carlos, CA (US)

(73) Assignee: YUTOU TECHNOLOGY (HANGZHOU) CO., LTD., Hangzhou (CN)

( * ) Notice: Subject to any disclaimer, the term of this patent is extended or adjusted under 35 U.S.C. 154(b) by 0 days.

(21) Appl. No.: 16/841,589

(22) Filed: Apr. 6, 2020

(65) Prior Publication Data

US 2020/0319464 A1    Oct. 8, 2020

Related U.S. Application Data

(60) Provisional application No. 62/829,369, filed on Apr. 4, 2019.

(51) Int. Cl.
| | |
|---|---|
| *G02B 27/01* | (2006.01) |
| *G02B 27/28* | (2006.01) |
| *F21V 8/00* | (2006.01) |
| *G02B 27/14* | (2006.01) |

(52) U.S. Cl.
CPC ......... *G02B 27/0172* (2013.01); *G02B 6/003* (2013.01); *G02B 6/0016* (2013.01); *G02B 6/0038* (2013.01); *G02B 6/0068* (2013.01); *G02B 27/149* (2013.01); *G02B 27/283* (2013.01); *G02B 2027/0114* (2013.01)

(58) Field of Classification Search
CPC .............. G02B 27/0172; G02B 27/283; G02B 27/149; G02B 27/4272; G02B 27/14; G02B 27/1033; G02B 6/0016; G02B 6/0068; G02B 6/003; G02B 6/0038; G02B 6/34; G02B 2027/0114
See application file for complete search history.

(56) References Cited

U.S. PATENT DOCUMENTS

| | | | | |
|---|---|---|---|---|
| 6,310,713 | B2 * | 10/2001 | Doany | G02B 27/0172 349/11 |
| 9,658,454 | B2 * | 5/2017 | Gadjali | G02B 27/017 |
| 9,664,905 | B2 * | 5/2017 | Bohn | G02B 5/18 |
| 9,766,464 | B2 * | 9/2017 | Poon | G02B 27/0172 |

(Continued)

*Primary Examiner* — Andrew Jordan
(74) *Attorney, Agent, or Firm* — Getech Law LLC; Jun Ye (57) ABSTRACT

Aspects for a wearable augmented reality (AR) device are described herein. The aspects may include a light engine that includes a micro-display configured to emit light to form an image, a polarized beam splitter positioned horizontally adjacent to the micro-display and configured to receive the emitted light that passes through the polarized beam splitter, and one or more first imaging lenses positioned horizontally adjacent to the polarized beam splitter and configured to receive the diverged light. One of the first imaging lenses may include a reflection surface configured to reflect and converge the light. The polarized beam splitter may include a reflective coating configured to reflect the converged light. The aspects may further include an optical waveguide configured to guide the converged light to a predetermined position.

15 Claims, 7 Drawing Sheets

(56) References Cited

U.S. PATENT DOCUMENTS

| | | | |
|---|---|---|---|
| 10,684,477 B2* | 6/2020 | Liu | G06F 3/013 |
| 10,746,989 B2* | 8/2020 | Brown | G02B 6/0096 |
| 2001/0013972 A1* | 8/2001 | Doany | G02B 27/0172 |
| | | | 359/489.11 |
| 2001/0026398 A1* | 10/2001 | Doany | G02B 27/0172 |
| | | | 359/485.07 |
| 2002/0149747 A1* | 10/2002 | Chuang | H04N 9/3167 |
| | | | 353/20 |
| 2003/0165013 A1* | 9/2003 | Doany | G02B 27/0172 |
| | | | 359/489.07 |
| 2015/0002528 A1* | 1/2015 | Bohn | G02B 27/0172 |
| | | | 345/589 |
| 2015/0070596 A1* | 3/2015 | Gadjali | G02B 27/0172 |
| | | | 349/11 |
| 2017/0176745 A1* | 6/2017 | Poon | G02B 27/0172 |
| 2020/0026072 A1* | 1/2020 | Brown | G02B 27/0103 |
| 2020/0284967 A1* | 9/2020 | Schowengerdt | G06F 3/013 |
| 2020/0319464 A1* | 10/2020 | Guan | G02B 6/0038 |

* cited by examiner

COMPACT LCOS PROJECTOR FOR WEARABLE AR DEVICES

BACKGROUND

Unless otherwise indicated herein, the materials described in this section are not prior art to the claims in this application and are not admitted to be prior art by inclusion in this section.

Wearable AR devices typically may include an image generation system configured to generate images and/or texts to provide information onto one or more lenses near to a viewer's eyes. The image generation system may further include multiple components such as light sources, lenses, processors, battery, etc. Because of its complexity, the image generation system is conventionally placed on top of the lenses and close to the viewers forehead, which may be inconvenient to the viewer and aesthetically less pleasing.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example wearable AR device. The example wearable AR device may include a light engine and an optical waveguide. The light engine may further include a micro-display configured to emit light to form an image, a polarized beam splitter positioned horizontally adjacent to the micro-display and configured to receive the emitted light that passes through the polarized beam splitter, one or more first imaging lenses positioned horizontally adjacent to the polarized beam splitter and configured to receive the diverged light. One of the first imaging lenses may include a reflection surface configured to reflect and converge the light. The polarized beam splitter may include a reflective coating configured to reflect the converged light. The optical waveguide may be configured to guide the converged light to a predetermined position.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or," which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding of the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

Figure 1:
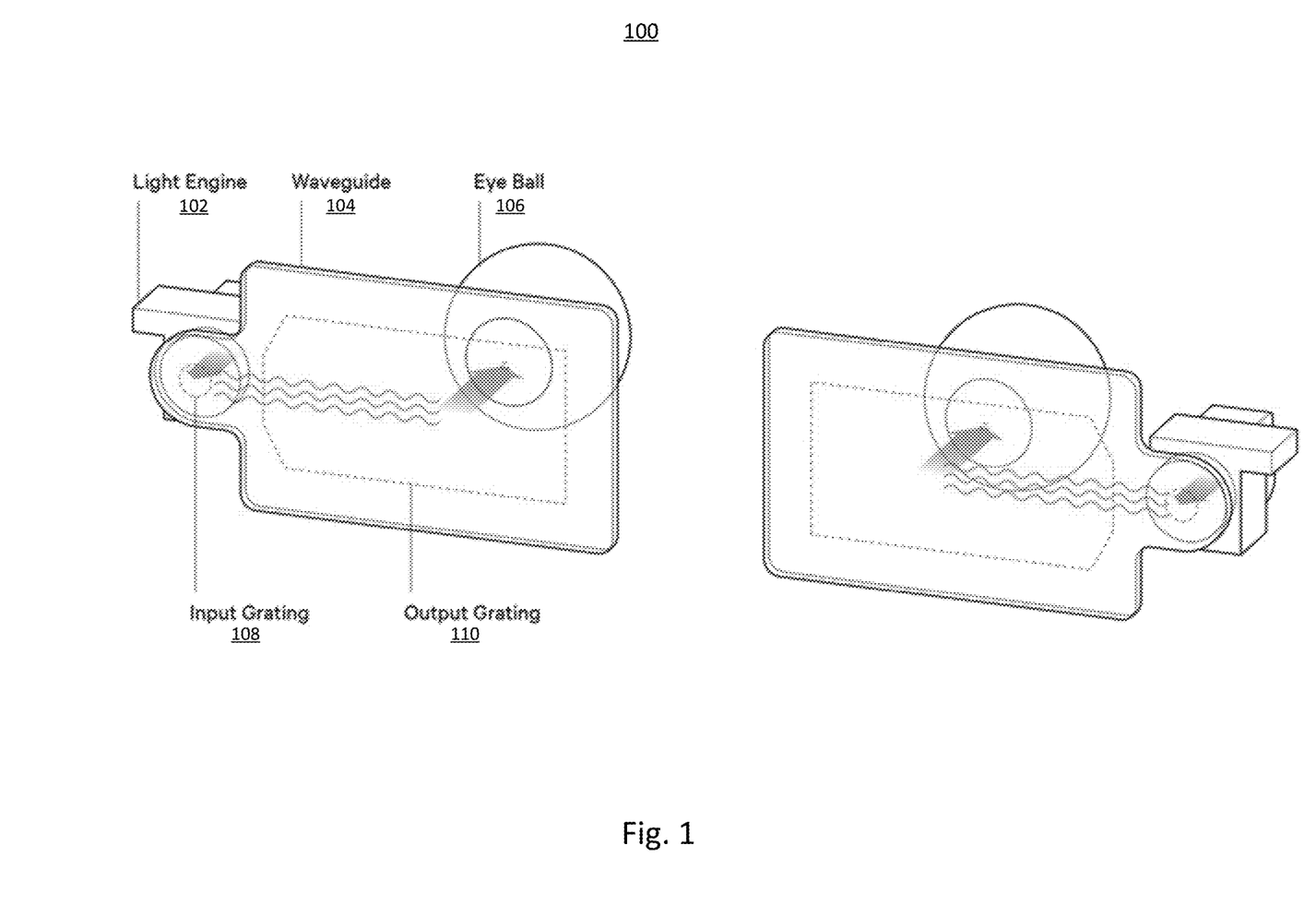
FIG. 1 is a perspective view of the wearable AR device in accordance with the disclosure.

FIG. 1 is a perspective view of an example wearable AR device 100. As depicted, the example wearable AR device 100 may include a light engine 102 configured to project light to form images or texts. In accordance with the disclosure below with more details, the size and the weight of the light engine 102 may be significantly reduced. As such, unlike the conventional wearable AR devices, the light engine 102 may be positioned at the side of the wearable AR device, e.g., close to an ear of the viewer.

The light projected by the light engine 102 may be received by an input grating 108, or an input coupling optical grating interchangeably. The input grating 108 may be configured to direct the received light to a direction such that the light may travel within a waveguide 104 to an output grating 110, or an output coupling optical grating interchangeably. The output grating 110 may be configured to direct the light to a viewer's eye, e.g., an eyeball 106, such that the formed images or texts may be perceived by the viewed.

Figure 2:
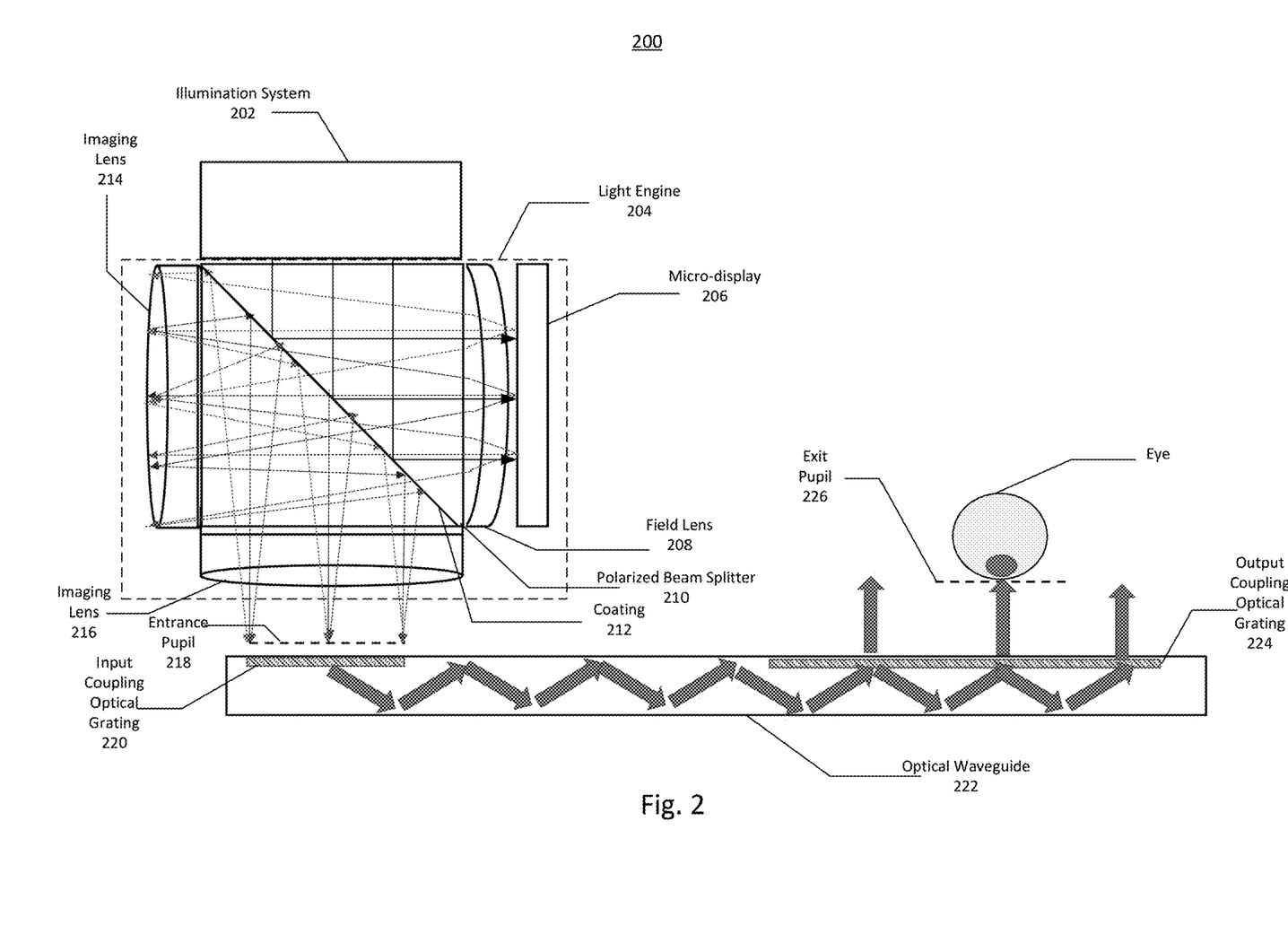
FIG. 2 is a diagram illustrating components of the wearable AR device in accordance with the disclosure.

FIG. 2 is a diagram illustrating components of an example wearable AR device 200 in accordance with the disclosure.

As depicted, the example wearable AR device 200 may include a light engine 204 and an optical waveguide 222. The light engine 204 may include a micro-display 206 configured to emit light to form images and/or texts. In some examples, the micro-display 206 may be configured to emit the light independently without activation from other components. For example, the micro-display 206 may be an organic light-emitting diode (OLED) device. In some other examples, the micro-display 206 may be a liquid crystal on silicon (LCOS) device that may require activation light and the light engine 204 may further include an illumination system 202 configured to provide light to activate the micro-display 206. As illustrated in FIG. 2, the illumination system 202 may be configured to emit light toward a polarized beam splitter 210 that includes an internal coating 212. The polarized beam splitter 210 may be positioned horizontally adjacent to the micro-display 206. The light may pass through a portion of the polarized beam splitter 210 and reflects at the internal coating 212. The reflected light may further reach and activate the micro-display 206. In some examples, the optical waveguide 222 may be an optical diffractive waveguide. In some other examples, the optical waveguide 222 may be an optical reflective waveguide.

Whether or not the micro-display 206 needs to be activated by the illumination system 202, the light emitted from the micro-display 206 may travel toward the polarized beam splitter 210. In some examples, an optional field lens 208 may be positioned between the polarized beam splitter 210 and the micro-display 206. The optional field lens 208 may be configured to diverge the light from the micro-display 206 before the light reaches the polarized beam splitter 210.

The light from the micro-display 206 may pass through the polarized beam splitter 210 and reach one or more imaging lenses 214 positioned horizontally adjacent to the polarized beam splitter 210. One of the surfaces of the imaging lens 214 may be coated with a layer of reflective coating such that the light is converged and reflected toward the polarized beam splitter 210. The light then may reach the internal coating 212 and be directed to the optical waveguide 222.

As the optical components of the light engine are placed at different facets of the polarized beam splitter 210, rather than sequentially aligned at one direction, the size of the light engine 204 may be reduced and the entire wearable AR device 200 may be compact for daily use. In one example, the illumination system 202 and the light engine 204 may be placed at different facets of the polarized beam splitter 210. In another example, the illumination system 202 placed at a facet adjacent to the facet where the light engine 204 placed at the polarized beam splitter 210, and the imaging lens 214 is placed at a facet opposite to the facet where the light engine 204 placed at the polarized beam splitter.

In some examples, one or more imaging lenses 216 may be positioned between the polarized beam splitter 210 and the optical waveguide 222 to further converge the light from the polarized beam splitter 210. In the case where the field lens 208 is not positioned between the polarized beam splitter 210 and the micro-display 206, the field lens 208 may be positioned between the polarized beam splitter 210 and the optical waveguide 222.

The converged light from the one or more imaging lenses 216 may be directed through an entrance pupil 218 of the optical waveguide 222 to an input coupling optical grating 220 of the optical waveguide 222. The input coupling optical grating 220 may be aligned with the exit pupil 218 and configured to direct the light to travel within the optical waveguide 222.

The optical waveguide 222 may further include an output coupling optical grating 224 positioned close to a viewer's eye. The output coupling optical grating 224 may be configured to direct the light from the optical waveguide 222 toward an exit pupil 226. The viewer may then perceive the images and/or texts formed by the light via the exit pupil 226.

Figure 3:
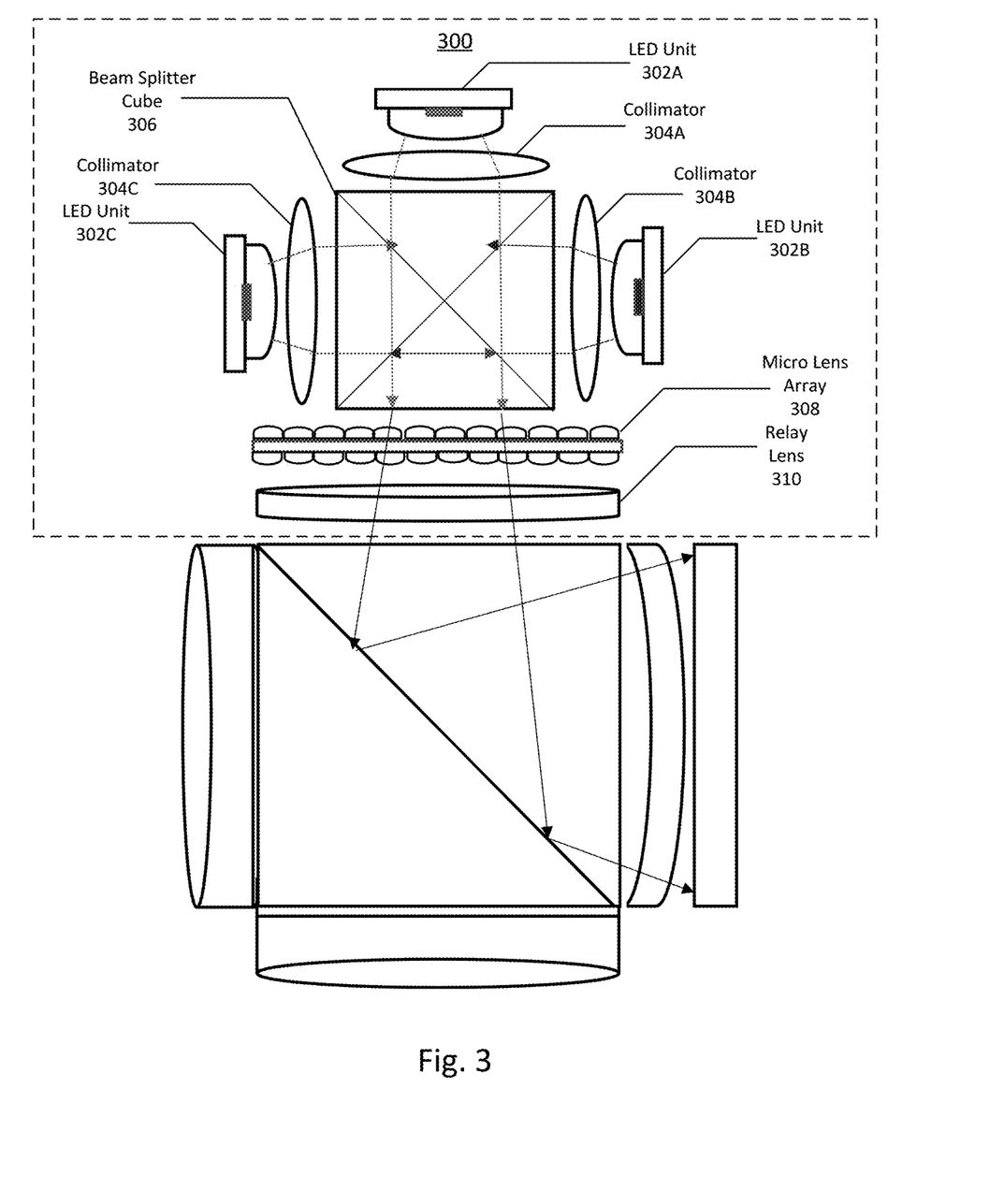
FIG. 3 is a diagram illustrating an example illumination system of the wearable AR device in accordance with the disclosure.

FIG. 3 is a diagram illustrating an example illumination system 300 of the wearable AR device in accordance with the disclosure.

As depicted, the example illumination system 300 may include a beam splitter cube 306 and three light-emitting diodes (LED) units 302A, 302B, and 302C (collectively "LED units 302") configured to respectively emit green light, blue light, and red light. The three LED units 302 may be positioned adjacent to three respective facets of the beam splitter cube 306 and configured to emit light from three different directions to the beam splitter cube 306. Three collimators 304A, 304B, and 304C (collectively "collimators 304") may be respectively coupled between each of the LED units 302 and the beam splitter cube 306 to diverge the light.

The beam splitter cube 306 may include internal reflective coatings. For examples, the light from the LED unit 302B and 302C may reach the internal reflective coatings in the beam splitter cube 306 and reflected toward the light engine.

A micro lens array 308 may be positioned between the beam splitter cube 306 and the light engine. The micro lens array 308 may include multiple compact lenses arranged together to receive the respective light from the LED units 302 and to mix the colors of the light. Further, a relay lens 310 may be placed between the micro lens array 308 and the light engine to diverge the light toward the light engine.

Figure 4:
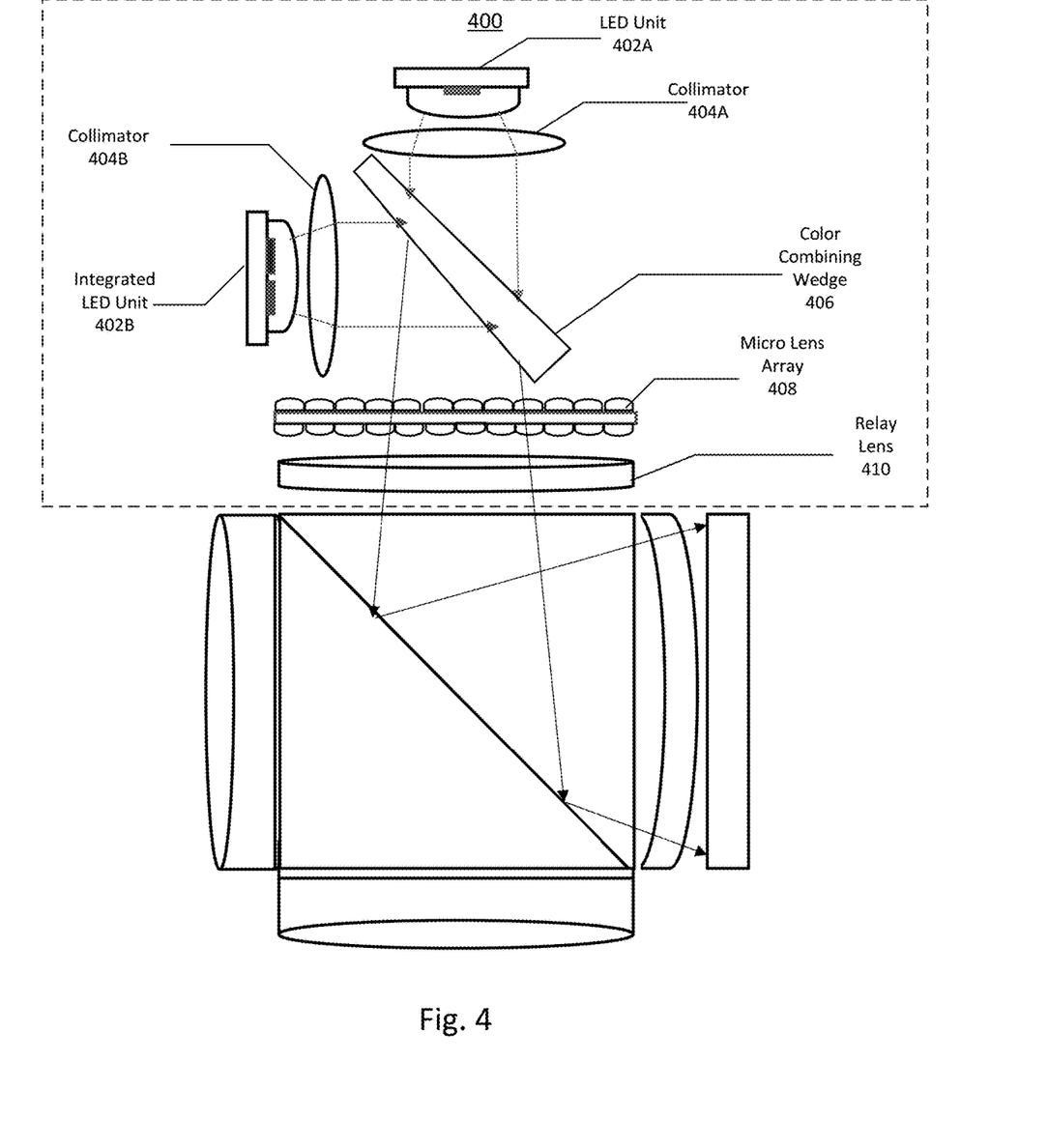
FIG. 4 is a diagram illustrating another example illumination system of the wearable AR device in accordance with the disclosure.

FIG. 4 is a diagram illustrating another example illumination system of the wearable AR device in accordance with the disclosure.

As depicted, the example illumination system 400 may include a color combining wedge 406 that includes two main surfaces. The color combining wedge 406 may refer to a wedge-shaped component that is at least partially transparent. An LED unit 402A may be positioned at one side of the color combining wedge 406 and an integrated LED unit 402B may be positioned at another side of the color combining wedge 406. In some examples, the LED unit 402A may be configured to emit green light and the integrated LED unit 402B may include LED units configured to emit blue light and red light.

Collimators 404A and 404B may be positioned respectively adjacent to the LED unit 402A and the integrated LED unit 402B to diverge the respective light emitted therefrom.

The light from the LED unit 402A may pass through the color combining wedge 406 toward the light engine and the light from the integrated LED unit 402B may be reflected from one surface of the color combining wedge 406 also toward the light engine.

The example illumination system 400 may further include a micro lens array 408 positioned between the light engine and the color combining wedge 406. The micro lens array 408 may include multiple compact lenses arranged together to receive the respective light from the LED unit 402A and the integrated LED unit 402B and to mix the colors of the light. Further, a relay lens 410 may be placed between the micro lens array 408 and the light engine to diverge the light toward the light engine.

Figure 5:
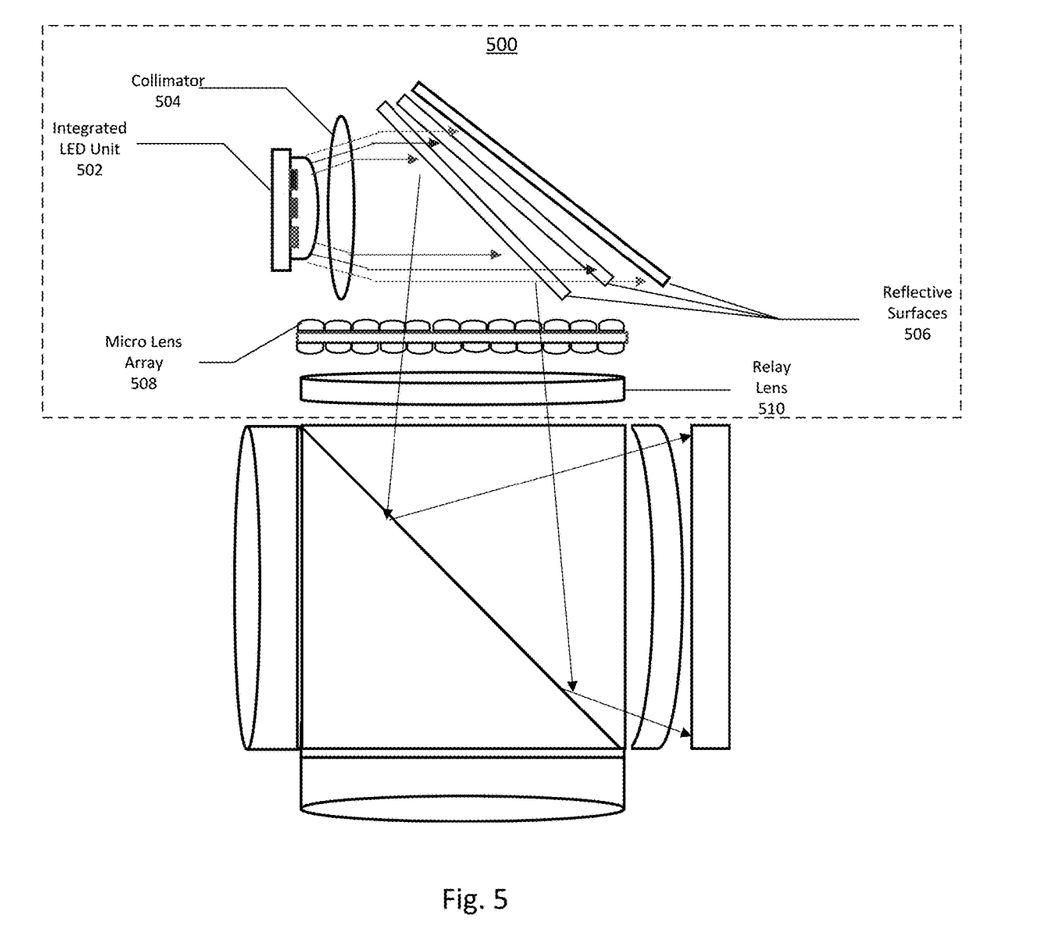
FIG. 5 is a diagram illustrating another example illumination system of the wearable AR device in accordance with the disclosure.

FIG. 5 is a diagram illustrating another example illumination system 500 of the wearable AR device in accordance with the disclosure.

As depicted, the example illumination system 500 may include an integrated LED unit 502 that includes LED units respectively configured to emit green light, red light, and blue light. A collimator 504 may be positioned adjacent to the integrated LED unit 502 to diverge the light from the integrated LED unit 502.

The light from the integrated LED unit 502 may reach a plurality of reflective surfaces 506. Light of different wavelengths may reflect at different surfaces of the reflective surfaces 506 toward the light engine.

Similarly, the example illumination system 500 may further include a micro lens array 508 positioned between the light engine and the reflective surfaces 506. The micro lens array 508 may include multiple compact lenses arranged together to receive the respective light reflected from the reflective surfaces 506 and to mix the colors of the light. Further, a relay lens 510 may be placed between the micro lens array 508 and the light engine to diverge the light toward the light engine.

Figure 6:
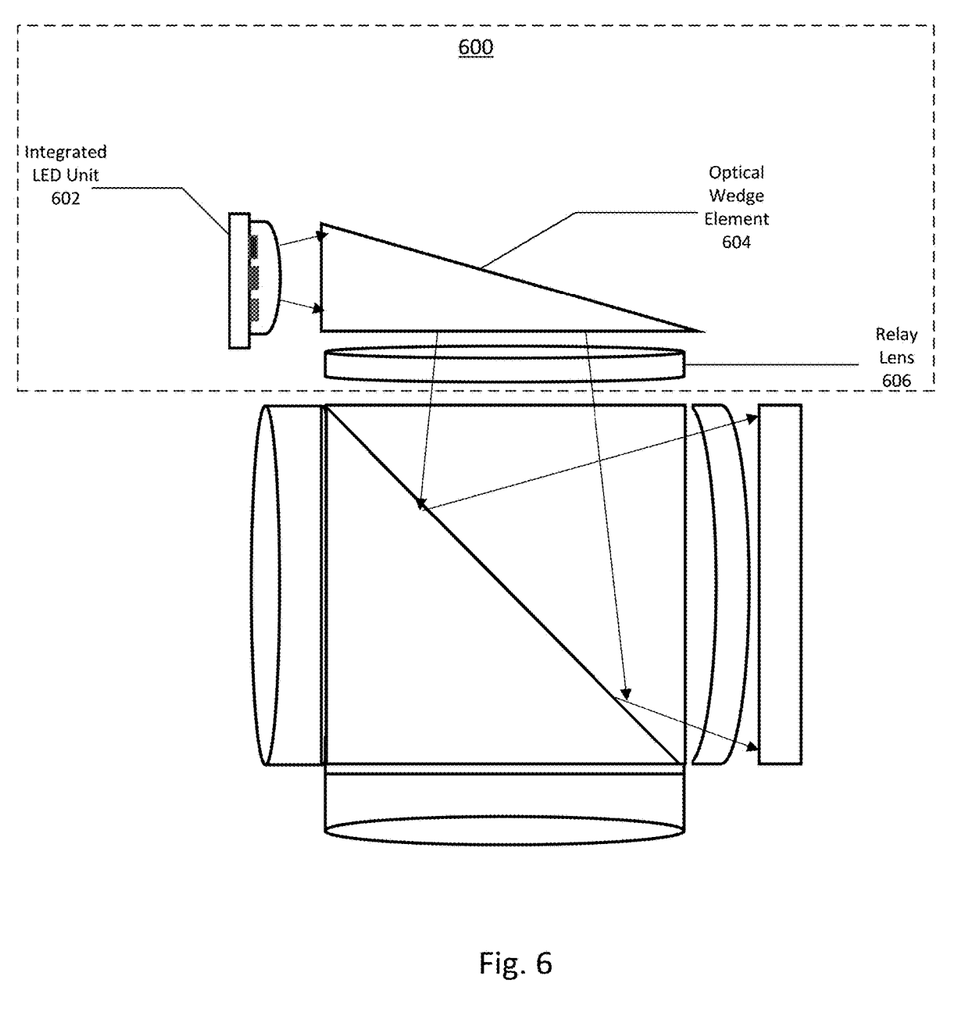
FIG. 6 is a diagram illustrating another example illumination system of the wearable AR device in accordance with the disclosure.

FIG. 6 is a diagram illustrating another example illumination system 600 of the wearable AR device in accordance with the disclosure.

As depicted, the example illumination system 600 may include an integrated LED unit 602 that includes LED units respectively configured to emit green light, red light, and blue light. The example illumination system 600 may further include an optical wedge element 604. The light from the integrated LED unit 602 may be reflected at a facet of the optical wedge element 604 toward the light engine. The example illumination system 600 may further include a relay lens 606 positioned between the optical wedge element 604 and the light engine. The relay lens 606 may be configured to diverge the light toward the light engine.

Figure 7:
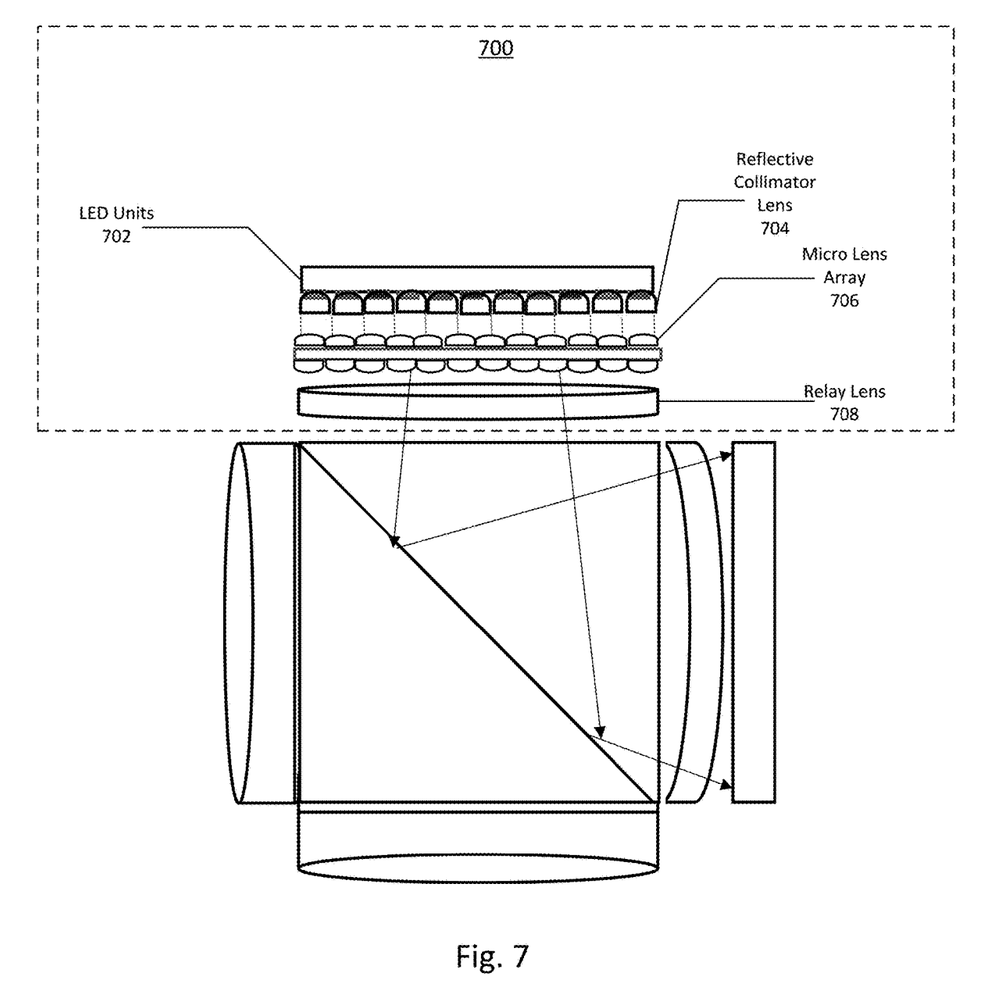
FIG. 7 is a diagram illustrating another example illumination system of the wearable AR device in accordance with the disclosure.

FIG. 7 is a diagram illustrating another example illumination system 700 of the wearable AR device in accordance with the disclosure.

As depicted, the example illumination system 700 may include LED units 702 arranged in an array. Each of the LED units 702 may be configured to emit green light, red light, or blue light. Multiple reflective collimator lens 704 may be coupled correspondingly to each of the LED units 702 to collimate the emitted light. The example illumination system 700 may further include a micro lens array 706. Similarly, the micro lens array 706 may include multiple compact lenses arranged together to receive the light from the reflective collimator lens 704 to mix the colors of the light. A relay lens 708 may be placed between the micro lens array 706 and the light engine to diverge the light toward the light engine.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. A wearable augmented reality (AR) device, comprising:
a light engine that at least includes:
   a micro-display configured to emit light to form an image,
   a polarized beam splitter positioned horizontally adjacent to the micro-display and configured to receive the emitted light that passes through the polarized beam splitter,
   one or more first imaging lenses positioned horizontally adjacent to the polarized beam splitter and configured to receive the diverged light,
      wherein one of the one or more first imaging lenses includes a reflection surface configured to reflect and converge the light, and
      wherein the polarized beam splitter includes a reflective coating configured to reflect the converged light, and
an optical waveguide configured to guide the converged light to a predetermined position.

2. The wearable AR device of claim 1, further comprising one or more second imaging lenses coupled between the polarized beam splitter and the optical waveguide and configured to further converge the converged light from the polarized beam splitter.

3. The wearable AR device of claim 1, wherein the optical waveguide includes an entrance pupil to receive the converged light from the polarized beam splitter.

4. The wearable AR device of claim 3, wherein the optical waveguide is an optical diffractive waveguide and further includes an input coupling optical grating configured to direct the received light to travel in the optical waveguide.

5. The wearable AR device of claim 4, wherein the optical waveguide further includes an output coupling optical grating configured to direct the light to the predetermined position.

6. The wearable AR device of claim 5, wherein the optical waveguide further includes an exit pupil that allows the light to pass through.

7. The wearable AR device of claim 3, wherein the optical waveguide is an optical reflective waveguide.

8. The wearable AR device of claim 1, further comprising a field lens positioned between the micro-display and the polarized beam splitter and configured to diverge the light from the micro-display.

9. The wearable AR device of claim 1, further comprising an illumination system configured to generate light to activate the micro-display.

10. The wearable AR device of claim 9, wherein the illumination system includes:
a beam splitter cube,
three LED units configured to project light of different colors toward the beam splitter cube respectively from three different direction,
a micro lens array configured to mix light emitted from the beam splitter cube, and
a relay lens configured to collimate the light mixed by the micro lens array.

11. The wearable AR device of claim 9, wherein the illumination system includes:
a green LED unit coupled to a first collimator lens,
an integrated LED unit that includes a red LED unit and a blue LED unit, wherein the integrated LED unit is coupled to a second collimator lens,
a color combining wedge configured to receive and combine light respectively emitted from the green LED unit and the integrated LED unit, and
a relay lens configured to collimate the light combined by the color combining wedge.

12. The wearable AR device of claim 9, wherein the illumination system includes:
an integrated LED unit that includes a red LED unit, a blue LED unit, and a green LED unit,
a collimator lens coupled to the integrated LED unit,
one or more reflective surfaces configured to combine the light from the integrated LED unit,
a micro lens array configured to mix colors of the light reflected from the one or more reflective surfaces, and
a relay lens configured to collimate the light that passes through the micro lens array.

13. The wearable AR device of claim 9, wherein the illumination system includes:
multiple LED units of different colors arranged in accordance with a predetermined pattern,
an optical wedge element configured to combine the different color from the multiple LED units, and
a relay lens configured to collimate the light that passes through the optical wedge element.

14. The wearable AR device of claim 9, wherein the illumination system includes:
multiple LED units of different colors arranged in accordance with a predetermined pattern,
multiple reflective lens coupled to each of the multiple LED units,
a micro lens array configured to mix colors of the light that passes through the multiple reflective lens, and
a relay lens configured to collimate the light that passes through the micro lens array.

15. The wearable AR device of claim 9, wherein the illumination system and the light engine are placed at different facets of the polarized beam splitter.

* * * * *